United States Patent Office 2,898,481
Patented Aug. 4, 1959

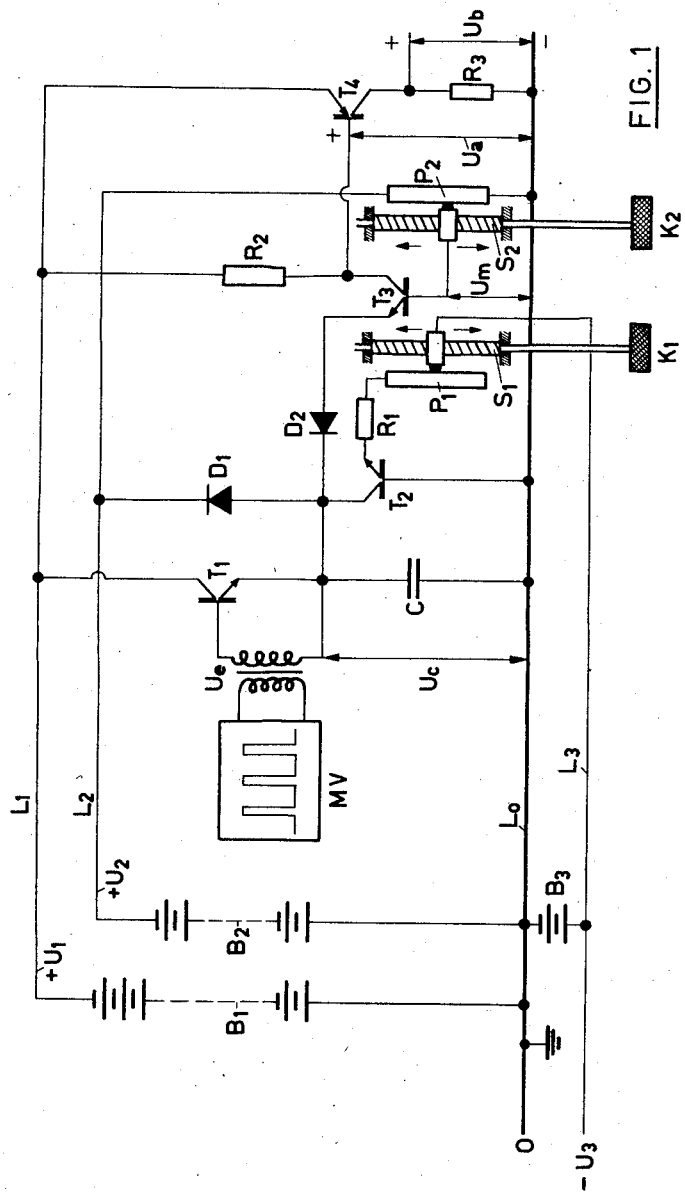

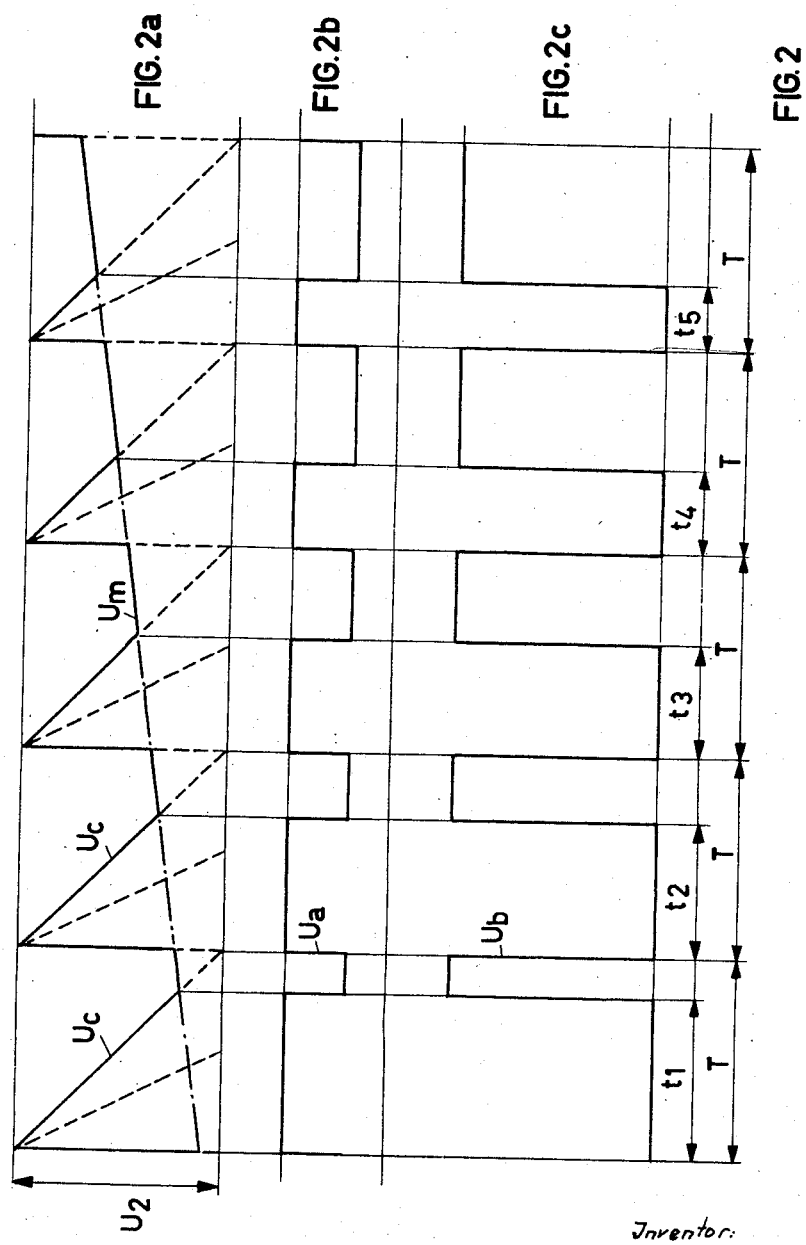

2,898,481

ELECTRIC CIRCUIT ARRANGEMENT

Hermann August Gähwiler, Zurich, Switzerland, assignor to Contraves A.G., Zurich, Switzerland Application February 27, 1958, Serial No. 718,001

Claims priority, application Switzerland March 1, 1957

9 Claims. (Cl. 307—106)

The present invention relates to an electric circuit arrangement including a temporarily charged condenser which discharges itself through a discharging circuit.

When the discharging circuit of a condenser contains an invariable resistor R the value of the discharge current is a function of the instantaneous value of the voltage applied to the condenser, which in turn decreases with the ensuing discharge. Accordingly, in principle no linear decrease of the condenser voltage as a function of time can be attained in the discharge of a condenser through a fixed resistance. Remedy is often sought by preventing the condenser from discharging completely but permitting it to discharge only partially, and by subsequently recharging it.

It is therefore a main object of this invention to provide a circuit arrangement in which the condenser has a linear discharge characteristic.

It is another object of this invention to provide means for modifying the width of an impulse.

It is still another object of this invention to provide a circuit arrangement for the purposes set forth, which is comparatively simple yet extremely accurate and reliable.

The present invention provides the possibility of attaining an ideal linear discharge characteristic of condensers over the whole range of the charging voltage. According to the invention the discharge is effected through the collector electrode of a transistor, the discharge current being adjustable to an unequivocally controllable value by the aid of a control current put into the emitter or the base electrode.

In transistors the collector current is adjustable by appropriate adjustment of a control current to a value which is independent of the magnitude of the effective voltage of the source, and which is also practically independent of the temperature, provided the discharge takes place over the collector-base or collector-emitter circuit, respectively, of the transistor and provided an appropriate source of control current is connected with the emitter or base electrode, respectively.

A wiring arrangement according to the invention is particularly suitable for the generation of an ideal saw tooth voltage, i.e. of a voltage which periodically surges to a value Uo and then drops linearly to the value zero within the time of a period.

The problem of charging a condenser periodically in a very short time to an accurately defined potential can be solved, for example, by connecting the collector electrode of a transistor serving as charging switch to a source of charging voltage the potential of which is higher than the charge potential to be reached, and by directly connecting the layer to be charged to the emitter electrode of this transistor, an impulse source being connected between emitter and base electrode, for example a multi-vibrator, which generates periodical short-time unblocking impulses, moreover the condenser layer which is to be charged is connected through a diode to a further source of voltage having the desired charging potential, so that if the desired charge potential is reached the redundant charging current is drawn off through this diode. In this manner it can be arranged that the condenser in a circuit according to the invention constitutes a source of an ideal saw tooth voltage. With the aid of a further transistor it is possible to carry out a voltage comparison between the instantaneous value of the condenser potential and a modulation voltage which is steplessly and arbitrarily variable between the full value of the charge potential and zero value; in this process advantageously the emitter electrode of this transistor may be connected to the source of the saw tooth voltage i.e. to the condenser, while the collector electrode is connected through a resistor to the source of charging voltage. Between the base electrode and the neutral conductor advantageously the modulating voltage is applied. Then the collector current increases abruptly to a predetermined limit value (the discharge current of the condenser), when the condenser potential has dropped to the value of the modulating voltage, and keeps flowing until the condenser is re-charged to the maximum value Uo. Based on these facts, a device for the modulation of the impulse width can be provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a diagram illustrating a preferred embodiment of the invention; and

Fig. 2, with portions 2a, 2b and 2c, shows a voltage-time diagram illustrating the performance thereof.

In Fig. 1 three sources of direct voltage are denoted, B1, B2 and B3, which are connected with one pole to a common neutral conductor $L_0$ having the potential zero against ground, and which keep the conductors L1, L2, L3 at the respective potentials $+U1$, $+U2$ and $-U3$, the potential U1 being higher than the potential U2. MV denotes a multi-vibrator or a similar source for brief periodically occurring voltage impulses, which are delivered from such a conventional device to the input winding of a transformer $U_e$.

One layer of a condenser C is connected to the neutral conductor $L_0$, and its other layer is connected to the emitter electrode of a transistor T1, the collector electrode of which is connected to the conductor L1 carrying the potential U1. The secondary coil of the transformer $U_e$, in which periodically (e.g. 10 times per second) unblocking impulses of very short duration (e.g. 2 to 4 milliseconds) for the collector circuit of the transistor T1 are induced, lies between the emitter and the base electrodes of the transistor.

The upper layer of the condenser C is connected through the diode D1 also with the conductor L2 carrying the potential U2 which allows the redundant charging current from the transistor T1 to flow off to the conductor L2 as soon as the voltage $U_c$ across the condenser C has reached the desired potential U2.

The discharge of the condenser C takes place over the collector electrode of the transistor T2 the base of which is connected to the neutral conductor $L_0$ and the emitter of which is electrically connected through a fixed resistor R1 and a variable potentiometer resistor P1 to the source of a negative control voltage (battery B3) by the line L3. Depending upon the adjustment of the tapping contact on the variable resistor P1 a discharge current $i_c$ of the charged condenser C is obtained which is steplessly variable right down to the minimum value $i_{cmin}$. The minimum value of the discharge current as determined by the magnitude of the fixed resistance R1 and by the value of the voltage —U3 is of such magnitude, that the condenser C charged to the voltage U is completely discharge within the time T (e.g. of 100 milliseconds) between two chargings (see straight voltage curve Uc of Fig. 2a) while the discharge takes place more quickly, when the discharge current $i_c$ is adjusted to a higher value (see dotted straight line in Fig. 2a).

In any case the voltage Uc of the condenser C diminishes following a strictly linear characteristic, and surges periodically again up to the full charging value U2.

The condenser C accordingly presents in this circuit arrangement a source for an ideal saw tooth voltage Uc. The positively charged layer of the condenser C is moreover connected to a steplessly variable modulation voltage source of the value Um through a diode D2 and the emitter-base circuit of a transistor T3, while the collector electrode of this transistor T3 is connected through a fixed resistance R2 to the line L1 carrying the potential +U1.

The source of the modulating voltage is furnished through the slidable terminal of a potentiometer P2 and the neutral conductor, the potentiometer P2 being inserted between the conductors L2 and $L_0$. By shifting the tapping contact along the potentiometer P2 the modulation voltage Um can accordingly be varied steplessly between the values zero and +U2.

In Fig. 2a a steady linear increase of the modulation voltage Um is shown by way of example. As soon as in such a circuit arrangement the condenser voltage Uc has dropped to a value equal to that of the modulation voltage Um, the passing current flows in the collector circuit of the transistor and in the resistor R2 so that the voltage Ua drops suddenly from the full value U1 to a lower voltage value. When the condenser is subsequently again recharged to the voltage U2, the passing current disappears again. In this manner a voltage curve Ua results, as shown in Fig. 2b.

The diode D2 serves only for improving the blocking resistance in the direction emitter-base of the silicon transistors which are preferably used because of their comparatively low temperature sensitivity.

The voltage Ua is applied to the base electrode of a switch transistor T4 the emitter eelctrode of which is connected to the conductor L1 and the collector electrode of which is connected through a fixed resistor R3 to the conductor $L_0$.

Therefore, voltage Ub appears across the resistor R3, the curve Ub of this voltage being indicated in Fig. 2c of the drawing.

This curve illustrates a series of rectangular impulses the steepness of the flanks being amplified by the switch transistor T4 each of which ends after a period T of constant duration (determined by the repeat frequency of the multi-vibrator MV) and begins, respectively, after a time interval ($t1$, $t2$, $t3$, $tm$) which is variable depending upon the seelcted value of the discharge current $ic$ and upon the instantaneous value of the modulation voltage Um.

The dependence of the impulse duration is determined, as will be readily realized, by the following equation:

$$t = \frac{Um\ C}{U2} \cdot \frac{1}{ic}$$

wherein for the modulation voltage Um the condition $$0 < Um < U2$$

and for the discharge current $ic$ the condition $$\frac{U2C}{T} < ic$$

must be met.

Hence the possibility results of modulating the impulse width in a linear-functional dependence of the ratio $$Um : ic$$

It lies within the discretion of those using a circuit according to the invention to insert transistors in varied arrangements (polarization) with simultaneous change of polarity of the source of control voltage, into the circuit arrangement described, and to provide other means for varying the control values $ic$ and Um, than those which are here illustrated as rotatable knobs K1 and K2 of threaded sprindles S1 and S2 carrying the tapping contacts of the potentiometers P1 and P2, respectively, in accordance with special requirements that may arise.

It is likewise possible to exploit further parameters in the circuit arrangement by varying the charging voltage U2 of the condenser in dependence of variable magnitudes and if desired also of the impulse frequency.

The essential feature is the accurate control of the discharge current $ic$ of a condenser through the collector electrode of a transistor.

It will be understood that each of the elements described above, or two or more together, may also find a useful application in other types of electric current arrangements differing from the types described above.

While the invention has been illustrated and described as embodied in circuit arrangements as temporarily charged condensers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. In an electric circuit arrangement comprising a condenser, in combination, means for temporarily charging said condenser to a predetermined voltage, including a first source of substantially constant potential connected to said condenser, a first transistor connected with its collector-emitter circuit in series between said first source of potential and said condenser, and means for applying periodical unblocking impulses to the base-emitter circuit of said first transistor; discharge means connected to said condenser, said discharge means including a second transistor connected with its collector electrode to said condenser; control means including a second source of potential, circuit means for applying said last mentioned potential to the emitter-base circuit of said first transistor for causing a control current to flow through said emitter-base circuit, and regulator means connected in said circuit for adjusting said control current and thereby adjusting the discharge current of said condenser to a predetermined fixed value.

2. In an electric circuit arrangement comprising a condenser, in combination, means for temporarily charging said condenser to a predetermined voltage, including a first source of substantially constant potential connected to said condenser, a first transistor connected with its collector-emitter circuit in series between said first source of potential and said condenser, and means for applying periodical unblocking impulses to the base-emitter circuit of said first transistor; discharge means connected to said condenser, said discharge means including a second transistor connected with its collector electrode to said condenser, an auxiliary discharge circuit connected to a junction point between said condenser and said collector electrode of said first transistor, said auxiliary discharge circuit including a second source of a substantially constant potential lower than said first potential and rectifier means between said second source of potential and said junction point; and control means including a third source of potential, circuit means for applying said last mentioned to the emitter-base circuit of said second transistor for causing a control current to flow through said emitter-base circuit, and regulator means connected in said circuit for adjusting said control current and thereby adjusting the discharge current of said condenser to a predetermined fixed value, whereby whenever said condenser is charged to a voltage equal to the potential of said second source the redundant charging current is dispensed with through said auxiliary discharge circuit, while the whole arrangement operates as a saw tooth voltage generator.

3. An electric circuit arrangement as set forth in claim 2, wherein said rectifier means is a diode.

4. In an electric circuit arrangement comprising a condenser, in combination, means for temporarily charging said condenser to a predetermined voltage, including a first source of substantially constant potential connected to said condenser, a first transistor connected with its collector-emitter circuit in series between said first source of potential and said condenser, and means for applying periodical unblocking impulses to the base-emitter circuit of said first transistor; discharge means connected to said condenser, said discharge means including a second transistor connected with its collector electrode to said condenser; voltage comparator means connected in parallel with said condenser, said comparator means including a third transistor connected with its emitter electrode to a junction point between said condenser and said second transistor, a source of modulating voltage connected in the collector-base circuit of said third transistor, and first regulator means connected in said collector-base circuit for adjusting said modulating voltage steplessly between zero and the voltage of said second source of potential so that the collector current of said third transistor rises abruptly when during the discharge of said condenser the decreasing voltage of the latter has dropped to a value equal to the adjusted modulating voltage; and control means including a second source of potential, circuit means for applying said potential to the emitter-base circuit of said second transistor for causing a control current to flow through said emitter-base circuit, and second regulator means connected in said circuit for adjusting said control current and thereby adjusting the discharge current of said condenser to a predetermined fixed value.

5. In an electric circuit arrangement comprising a condenser, in combination, means for temporarily charging said condenser to a predetermined voltage, including a first source of substantially constant potential connected to said condenser, a first transistor connected with its collector-emitter circuit in series between said first source of potential and said condenser, and means for applying periodical unblocking impulses to the base-emitter circuit of said first transistor; discharge means connected to said condenser, said discharge means including a second transistor connected with its collector electrode to said condenser, an auxiliary discharge circuit connected to a junction point between said condenser and said collector electrode of said first transistor, said auxiliary discharge circuit including a second source of a substantially constant potential lower than said first potential and rectifier means between said second source of potential and said junction point; voltage comparator means connected in parallel with said condenser, said comparator means including a third transistor connected with its emitter electrode to a junction point between said condenser and said second transistor, a source of modulating voltage connected in the collector-base circuit of said third transitor, and first regulator means connected in said collector-base circuit for adjusting said modulating voltage steplessly between zero and the voltage of said second source of potential so that the collector current of said third transistor rises abruptly when during the discharge of said condenser the decreasing voltage of the latter has dropped to a value equal to the adjusted modulating voltage; impulse delivering means comprising a fourth transistor connected with its base to the collector electrode of said third transistor, while said first source of potential is connected in circuit with the emitter and collector electrodes of said fourth transistor, a fixed resistance connected in the collector circuit thereof; and control means including a third source of potential, circuit means for applying said last mentioned potential to the emitter-base circuit of said second transistor for causing a control current to flow through said emitter-base circuit, and second regulator means connected in said circuit for adjusting said control current and thereby adjusting the discharge current of said condenser to a predetermined fixed value, whereby whenever said condenser is charged to a voltage equal to the potential of said second source the redundant charging current is dispensed with through said auxililary discharge circuit, while the whole arrangement operates as a saw tooth voltage generator, voltage impulses appearing across said fixed resistance and having a width depending upon the said adjusted modulating voltage.

6. An electric circuit arrangement for establishing a linear discharge characteristic of a condenser, comprising, in combination, a condenser having a first and a second plate means; charging means for temporarily charging said condenser, said charging means comprising a first source of substantially constant potential, electronic switch means and a source of de-blocking impulses for controlling said switch means connected in circuit with said first source and with said first plate means of said condenser; discharge means comprising a second source of substantially constant predeterminable potential, transistor means and rectifier means series-connected between said second source and said first plate means for causing, when said condenser has been charged to a potential substantially equal to that of said second source, excess charging current to flow from the collector of said transistor means via said rectifier means; and regulating means comprising a third source of potential in circuit with the base-emitter path of said transistor means for applying a control current thereto, and voltage adjusting means between said third source and said transistor means for maintaining the discharge current of said condenser at a substantially constant value by adjustment of said control current.

7. An electric circuit arrangement for establishing a linear discharge characteristic of a condenser, comprising, in combination, a condenser having a first and a second plate means; charging means for temporarily charging said condenser, said charging means comprising a first source of substantially constant potential, first transistor means and a source of de-blocking impulses for controlling said transistor means connected in circuit with said first source and with said first plate means of said condenser; discharge means comprising a second source of substantially constant predeterminable potential, second transistor means and rectifier means series-connected between said second source and said first plate means for causing, when said condenser has been charged to a potential substantially equal to that of said second source, excess charging current to flow from the collector of said second transistor means via said rectifier means; and regulating means comprising a third source of potential in circuit with the base-emitter path of said second transistor means for applying a control current thereto, and voltage adjusting means between said third source and said second transistor means for maintaining the discharge current of said condenser at a substantially constant value by adjustment of said control current.

8. A circuit arrangement as claimed in claim 7, including voltage comparator means, said voltage comparator means comprising a third transistor means having its emitter-base circuit connected in parallel with said condenser, second voltage adjusting means in circuit with said second source and being adjustable for applying to the base of said third transistor means a modulation voltage steplessly variable between zero and the potential of said second source, the collector of said third transistor being in circuit with said first source, in such a manner that the collector current of said third transistor changes abruptly under the influence of said modulation voltage both when said condenser is being charged and when the charge potential of said condenser decreases to a value equal to said modulation voltage as adjusted.

9. A circuit arrangement as claimed in claim 8, wherein said first and second voltage adjusting means are capable of determining said modulation voltage and the discharge current of said condenser in such a manner that while said modulation voltage is varied steplessly between zero and the potential of said second source, the discharge current of said condenser is steplessly varied in the range above $$i_{c_{min}} = \frac{U_2 C}{T}$$

wherein $i_c$ is the discharge current, $U_2$ is the potential of said second source, C is the capacity of said condenser and T is the pulse period of said de-blocking impulses, whereby the impulse width of said impulses is made a linear function of $U_m : i_c$, wherein $U_m$ is said adjustable modulation voltage.

References Cited in the file of this patent

UNITED STATES PATENTS

| | | |
|---|---|---|
| 2,614,142 | Edson | Oct. 14, 1952 |
| 2,644,895 | Lo | July 7, 1953 |